MEMORY SYSTEMS
Filed Dec. 11, 1956 2 Sheets-Sheet 1
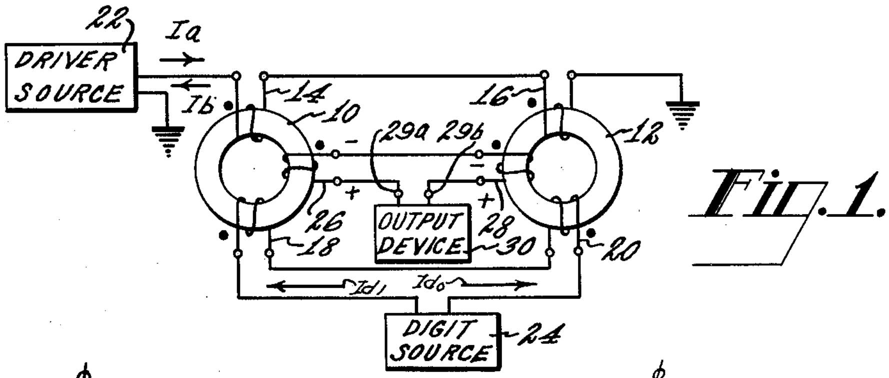
FIG. 1.
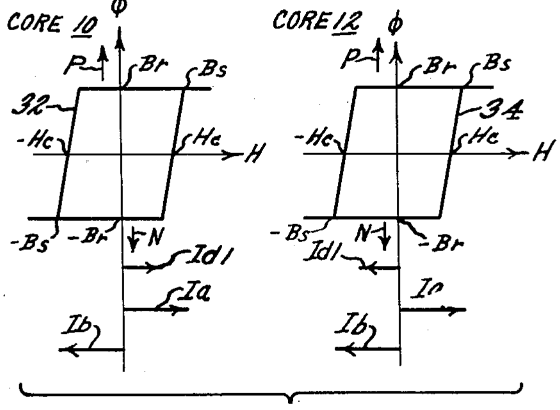
FIG. 2.
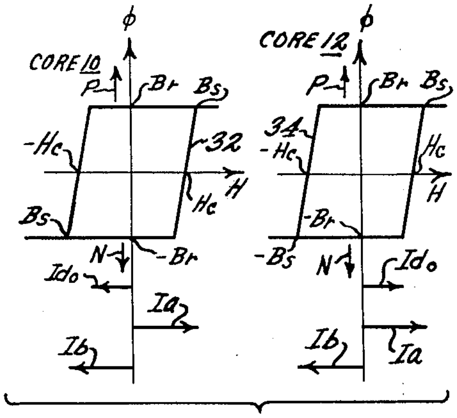
FIG. 3.
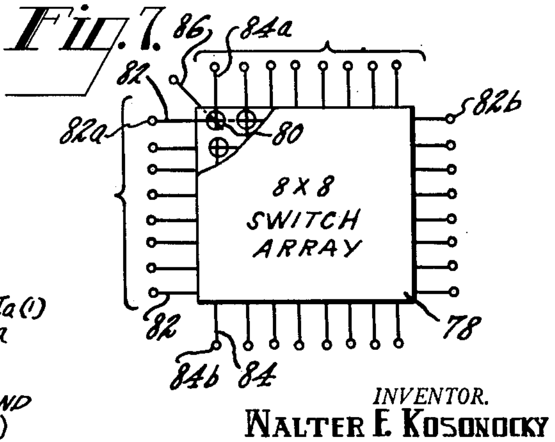
FIG. 5.
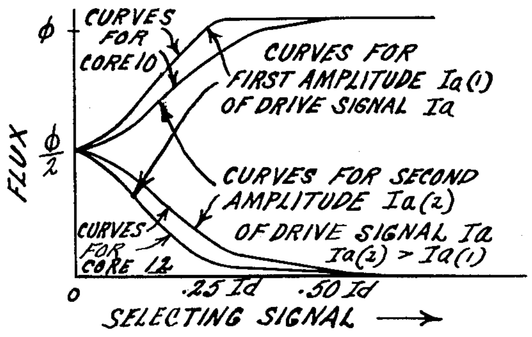
INVENTOR.
WALTER F. KOSONOCKY
BY *Morris A. Lakkin*
ATTORNEY July 3, 1962 W. F. KOSONOCKY 3,042,905

MEMORY SYSTEMS

Filed Dec. 11, 1956 2 Sheets-Sheet 2

INVENTOR.
WALTER F. KOSONOCKY

BY Morris Rabkin

ATTORNEY

3,042,905
MEMORY SYSTEMS

Walter F. Kosonocky, Newark, N.J., assignor to Radio Corporation of America, a corporation of Delaware
Filed Dec. 11, 1956, Ser. No. 627,694
7 Claims. (Cl. 340—174)

This invention relates to memory systems, and particularly to memory systems using magnetic elements.

In certain of the prior magnetic memory systems, coincident-current selection is used for selecting a desired element of an array of magnetic elements. The elements are arranged in an "*n*" dimensional coordinate system. Coincident-current selection may involve applying separate excitation coincidentally to two or more of the "*n*" coordinates. In practice, the amplitudes of the separate excitations are limited such that only desired ones of the elements receive a net excitation in excess of their respective coercive forces. The remaining elements receive either zero excitation or an excitation less than their respective coercive forces.

It is well-known that the switching speed of magnetic elements of rectangular hysteresis loop characteristics is proportional to the amplitude of the applied excitation. Accordingly, the speed of operation of certain of the prior systems is limited because the current amplitudes of the separate excitations are limited.

It is an object of the present invention to provide improved magnetic systems which can be operated at a faster speed than similar types heretofore known.

Another object of the present invention is to provide improved memory systems using selection techniques, wherein a selecting current need not be regulated in amplitude as closely as in certain prior types.

Another object of the present invention is to provide improved magnetic memory systems using magnetic switch elements in such a way that the speed of operation of the system is increased over prior systems using magnetic switch elements.

According to the present invention, a pair of similar magnetic elements are used for storing each binary information digit. Initially, both elements of the pair are in the same remanent state. A one magnetizing force is applied to both elements in a direction to change a desired one of said elements from its initial remanent state to the other remanent state and to hold the other of the elements in its initial remanent state. Another magnetizing force is applied to both elements concurrently with the first magnetizing force. The other magnetizing force is in a direction to change each of the elements from its initial to the other remanent state. The other magnetizing force then changes the desired element, which is conditioned by the one magnetizing force, from the initial to the other state. By limiting the volt-second integral of the other magnetizing force to a value equal to that absorbed by one of the elements in changing its state, relatively fast switching of the desired element is achieved. Moreover, the current amplitudes of the signals producing the magnetizing forces need not be restricted, but can vary over a relatively wide range. By varying the polarity of the first magnetizing force, the one or the other of the two elements is conditioned for changing from its initial to the other state.

In the accompanying drawing:

FIG. 1 is a schematic diagram of a memory system, according to the invention, using a pair of elements;

FIGS. 2 and 3 are each a graph of hysteresis loops, somewhat idealized, for the two memory elements of the system of FIG. 1, and useful in explaining the operation of that system;

FIG. 5 is a graph of flux ($\phi$) vs. selecting current of the system of FIG. 1;

FIG. 7 is a schematic diagram of a switch array of the system of FIG. 6.

Figure 4:
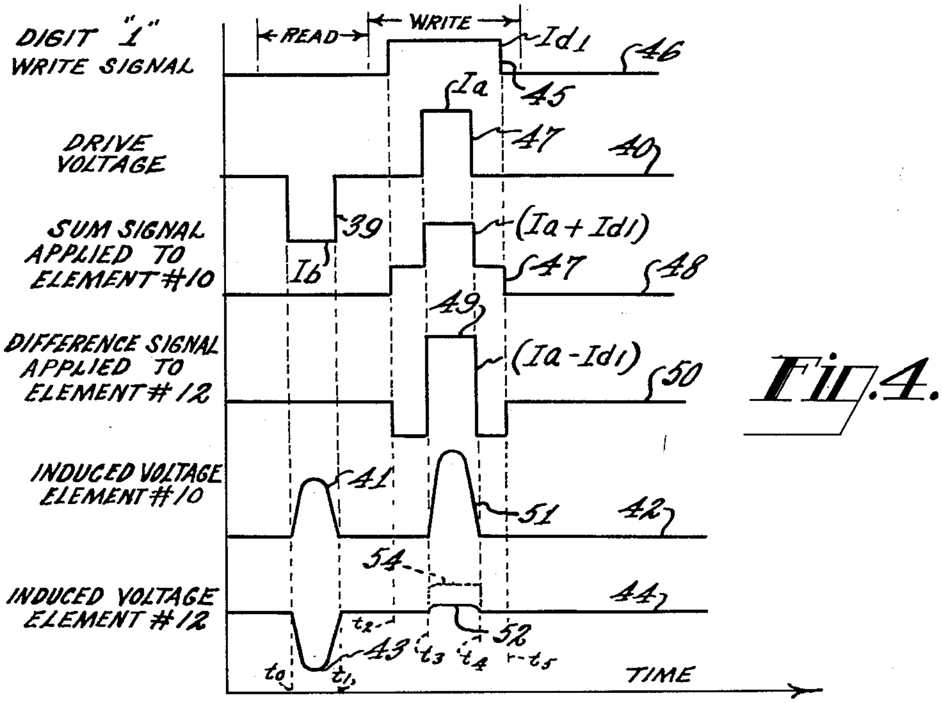
FIG. 4 is a timing diagram of waveforms useful in explaining the operation of the system of FIG. 1.

Referring to FIG. 1, two magnetic cores 10 and 12 are used for storing a single bit binary digit of information. Each of the elements 10 and 12 are similar and are made from substantially rectangular hysteresis loop material. The elements 10 and 12 may be toroidal cores, as shown, or may take other known forms. Certain metallic materials such as 4–79 Molybdenum-Permalloy, and certain ceramic materials such as Manganese-Magnesium ferrite, exhibit substantially rectangular hysteresis characteristics.

The cores 10 and 12 are linked respectively by first and second drive windings 14 and 16; respectively by first and second selecting windings 18 and 20; and respectively by first and second output windings 26 and 28. The sense of linkage of a winding of a core is indicated by a conventional dot notation. In this notation, positive conventional current flowing into a winding at a dot-marked terminal changes a core from one state, say a state denoted "N", to the other state "P", if it is not already in the state P; and, upon termination of the current, the core remains in the state P, at a remanent condition which we will term $+Br$. Current flowing into a winding at an unmarked terminal changes the core from the state P to the state N, if not already in the state N, and, upon termination of this current, the core remains in the state N and is in a remanent condition $-Br$. When a core is changed from the state N to the state P, an output voltage is induced across each of the windings linked to that core in a polarity to cause current flow out of the winding at the dot-marked terminal; that is, the polarity of the induced voltage is positive at the marked terminal for an external load circuit. When a core is changed from the state P to the state N, the voltages across the windings are each in a direction to cause current to flow out of the windings from the unmarked terminal of the respective windings. The unmarked terminal of the first drive winding 14 is connected to the marked terminal of the second drive winding 16. The marked terminal of the first drive winding 14 is connected to one output terminal of a driver source 22. The other output terminal of the driver source 22 and the unmarked terminal of the second drive winding 16 are each connected to a common reference source indicated in the drawing by the conventional ground symbol. The driver source 22 may be any suitable, known source arranged for supplying alternate-polarity signals $Ia$ and $Ib$ of predetermined volt-second magnitude to the drive windings 10 and 14. Preferably, the driver source 22 is a voltage source, as described hereinafter. The selecting windings 18 and 20 have their unmarked terminals connected to each other, and have their marked terminals connected, respectively, to two outputs of a digit source 24. The digit source 24 may be any source arranged for supplying one or the other opposite-polarity selecting signals $Id_1$ and $Id_0$ to the marked terminals of the selecting windings 18 and 20. The marked terminals of the output windings 26 and 28 are connected to each other, and the unmarked terminals are connected respectively to a pair of output terminals **29*a*, 29*b*. An output device 30 is connected across the output terminals 29*a*, 29*b*. The output device 30 may be any device responsive to signals produced in the output windings 26 and 28 of the cores 10 and 12**.

During operation, the pair of memory cores 10 and 12 together serve to store a single binary digit; namely, a binary "0" or a binary "1." For example, in the case of a binary "1," the cores 10 and 12 may be magnetized in the states P and N, respectively; and in the case of a binary "0," the cores 10 and 12 may be magnetized in the states N and P, respectively. Each memory cycle may comprise a reading operation in which the stored information is read by applying a single drive signal I*b* to the drive windings 14 and 16 and observing the polarity of the response voltage induced in the output windings 26 and 28. If the cores 10 and 12 are initially in the states P and N, respectively, representing a binary "1," then a response voltage of one polarity, with the output terminal 29*a* positive relative to the terminal 29*b*, is applied to the output device 30 because the core 10 is driven from the state P to the state N. If the cores 10 and 12 are initially in the states N and P, respectively, representing a binary "0," then a response voltage of the opposite polarity, with the output terminal 29*b* positive relative to the output terminal 29*b*, is applied to the output device 30 because the core 12 is driven from the state P to the state N. In either case, the other of the cores 10 and 12 that is in the state N, prior to the application of the drive signal I*b*, remains in the state N.

The curves 32 and 34 of FIG. 2 each represent a rectangular hysteresis characteristic for the cores 10 and 12, respectively, of FIG. 1, in which H, the magnetic force, is plotted against $\phi$, the flux. The two remanent points B*r* and —B*r* for the states P and N, respectively, are located at the upper and lower intersections of the curves 32 and 34 with the $\phi$ axis.

A magnetizing force in the "positive" sense, in excess of the coercive force H*c*, changes a core which is initially in the state N to the state P; and a magnetizing force of the opposite sense, in excess of the coercive force —H*c*, changes a core which is initially in the state P to the state N.

The arrows in FIGS. 2 and 3, marked to correspond to the various currents and shown beneath the curves 32 and 34, are used to indicate in a qualitative way the directions and amplitudes of the magnetizing forces applied to the cores 10 and 12 by these respective currents. Thus, the arrow I*b* in FIG. 2 indicates that the amplitude of this magnetizing force, due to the current I*b*, exceeds the coercive force H*c* of each of the cores 10 and 12 and is sufficient to change either one of the cores 10 and 12 from an initial state P to the other state N. The amplitude of the drive signal I*b* may be as large as desired. Upon termination of the drive signal I*b*, both the cores 10 and 12 are magnetized in the state N.

Each reading operation may be followed by a writing operation. During the writing operation, a binary "1" or a binary "0" is written into the cores 10 and 12 under the joint control of a second drive signal I*a* from the source 22, and a selecting signal I$d_1$ or I$d_0$ applied to the digit windings 18 and 20 from the source 24. Assume that it is desired to write a binary "1" by changing the core 10 to the state P and leaving the core 12 in the state N. The digit source 24 is operated to apply a selecting signal I$d_1$ to the selecting windings 18 and 20. The selecting signal I$d_1$ flows into the selecting winding 18 at its marked terminal and into the selected winding 20 at its unmarked terminal. As indicated in FIG. 2 by the arrows marked I$d_1$ beneath the curves 32 and 34, the selecting signal I$d_1$ applies a magnetizing force (M.M.F.) tending to change the core 10 from its —B*r* remanent condition towards its positive saturation condition B*s*; and applies an M.M.F. tending to change the core 12 from its —B*r* remanent condition towards its negative saturation condition —B*s*. The drive signal I*a* is applied to the cores 10 and 12 concurrently with the selecting signal I$d_1$. Therefore, since the total applied magnetizing force I*a* plus I$d_1$ exceeds H*c*, the core 10 is changed from remanence in the state N to its positive saturation condition B*s*. Upon termination of the drive and the selecting signals I*a* and I$d_1$, the core 10 is at its B*r* remanent condition. Upon termination of the drive and the selecting signals I*a* and I$d_1$, because I*a* exceeds I$d_1$ by less than the coercive force H*c*, the core 12 returns substantially to its —B*r* remanent condition. Accordingly, the first core 10 is changed to the state P and the second core 12 is held in the state N.

When it is desired to write a binary "0," an opposite-polarity selecting signal I$d_0$ is applied to the selecting windings 18 and 20 by the digit source 24, as indicated in FIG. 3. The selecting signal I$d_0$ applies an M.M.F. tending to change the core 10 from its —B*r* remanent condition towards its negative saturation condition —B*s*; and applies an M.M.F. tending to change the core 12 from its —B*r* remanent condition towards its positive saturation condition +B*s*. Now, when the drive signal I*a* is concurrently applied to the cores 10 and 12, the core 12 changes to its positive saturation condition B*s*. After the termination of the drive and selecting signals I*a* and I$d_0$, the core 12 is at its B*r* remanent condition. Because the drive signal I*a* exceeds I$d_0$ by less than the coercive force H*c*, the core 10 returns substantially to its —B*r* remanent condition. The selecting signals I$d_1$ and I$d_0$ preferably are initiated before and terminated after the drive signal I*a*. However, both the drive and selecting signals may be initiated and terminated at the same time, if desired.

Accordingly, by applying either the selecting signal I$d_1$ or the selecting signal I$d_0$, either the core 10 or the core 12 can be changed from the initial state N to the state P, and the other core 10 or 12 is left in its initial state N.

FIG. 4 is a timing diagram of waveforms of various signals used in operating the system. The memory may be "cleared" by reading from it. The drive signal I*b* is applied during the read operation between the times $t_0$ and $t_1$, as illustrated by the negative pulse 39 of the waveform 40 (second from the top). If the first core 10 is initially in the state P, a "positive" polarity output signal is produced across the output terminals 29*a*, 29*b* (which terminal 29*a* is positive with respect to terminal 29*b*) between the times $t_0$ and $t_1$, as indicated by the positive pulse 41 of the waveform 42 (second from the bottom). If the second core 12 is initially in the state P, a "negative" polarity output signal is produced across the output terminals 29*a*, 29*b* (with terminal 29*b* positive with respect to terminal 29*b*) between the times $t_0$ and $t_1$, as indicated by the negative pulse 43 of the bottom waveform 44. Thus, a binary "1" digit is indicated by the positive pulse 41, and a binary "0" digit is indicated by the negative pulse 43.

The read operation may be followed by a write operation. Assume that it is desired to write a binary "1" by changing the core 10 to the state P. At a time $t_2$, the selecting signal I$d_1$ is initiated and applied to the selecting windings 18 and 20 of the cores 10 and 12, as illustrated by the positive pulse 45 of the top waveform 46 of FIG. 4. The amplitude of the selecting signal may be limited so that substantially no flux change is produced in the cores 10 and 12 by the selecting signal I$d_1$ itself. At a later time $t_3$, the drive signal I*a* is initiated, as indicated by the positive pulse 47 of the waveform 40. The drive signal I*a* applies an additional positive M.M.F. to the first core 10, as indicated by the positive pulse 47 (I*a*+I$d_1$) of the waveform 48 (third from the top). A positive M.M.F. equal to the difference between the signals I*a* and I$d_1$ is applied to the core 12 at the time $t_3$, as indicated by the composite pulse 49 of the waveform 50 (fourth from the top). A relatively large output voltage, indicated by the relatively large, positive pulse 51 of the waveform 42 (fifth from the top) is induced in the core 10 output winding 26 when the drive signal I*a* is applied. The voltage pulse 51 corresponds to a relatively large flux change in the core 10. However, no, or at most a relatively small, voltage is produced in the output winding 28 of the core 12 between the times $t_3$ and $t_4$ when the drive signal I*a* is applied. The output voltage of the core 12 is indicated in the bottom waveform 44 by the relatively small, positive voltage pulse 52. The pulse 52 corresponds to a relatively small flux change in the core 12. Upon termination of the selecting current $Id_1$, at a later time $t_5$, the core 12 returns to, or substantially near, its initial remanent condition $-Br$; and the core 10 changes to its B*r* remanent condition. Similar waveforms are obtained when the selecting current $Id_0$ is applied. For example, waveforms for the other selecting current $Id_0$ can be ascertained by interchanging the legends 10 and 12 to the left of each of the waveforms 42, 44, 48 and 50.

Two voltage pulses are shown on the bottom waveform 44 between the times $t_3$ and $t_4$ when the drive signal I*a* is applied. The smaller amplitude pulse 52 is exaggerated and corresponds to the case when the difference signal $(Ia-Id_1)$ produces a resultant M.M.F. equal to, or less than, the coercive force H*c* of the core 12. The proportional distribution of the energy of the drive signal I*a* between the two cores 10 and 12 can be approximated fairly closely by comparing the areas of the voltage pulses induced in the output windings of the two cores between the times $t_3$ and $t_4$.

Thus, referring again to FIG. 4, the larger voltage pulse 54 (shown dotted) of the waveform 44 is produced when the difference signal $(Ia-Id_1)$ exceeds the coercive force H*c* of the non-selected core 12. Some flux change is thus produced in the core 12. The larger voltage pulse 54 corresponds to the amount of the flux change produced in the core 12. Thus, for a larger difference signal $(Ia-Id_1)$, the volt-second output of the driver source 22 (FIG. 1) divides unevenly between the cores 10 and 12 with most of the output going to the selected core 10, because there is a larger voltage drop across the drive winding on this core when it is switched. During a later read operation, the amplitude of the output signal applied to the output device 30 is smaller than if no flux change were produced in the non-selected core 12. A smaller output signal also results because of the smaller total flux change produced in the selected core 10.

The graph of FIG. 5 illustrates in greater detail the flux distribution between the selected core 10 and the non-selected core 12 for selecting signals of different amplitudes related to the amplitude I*d* of FIG. 1 as a standard. The values of the selecting signals along the abscissa of FIG. 5 are related to the switching characteristics of the cores 10 and 12, as indicated by the similarity of the distances along the abscissa of the curve 32 of FIG. 2. The curves 60 and 64 of FIG. 5 show the flux changes in the cores 10 and 12 for a first amplitude $Ia(1)$ of drive signal I*a*, and the other two curves 62 and 66 show the flux change in the cores 10 and 12 for a second greater amplitude $Ia(2)$ of drive signal I*a*; that is, $Ia(2)>Ia(1)$. However, the drive signal I*a* is adjusted in time so that the total flux (volt-time integral) of the two drive signals is the same. This total flux is indicated as $\phi$. The drive signal $Ia(1)$ produces a magnetizing force equal to the coercive force H*c* of the cores 10 and 12 (as may be noted from FIG. 2). When no selecting signal is applied, the drive signal $Ia(1)$ produces equal flux changes in both the cores 10 and 12, because both cores start from the same condition of remanence and are changed an equal amount in flux. For a selecting signal I*d* of larger than zero value, less flux change is produced in the non-selected core 12 and more flux change is produced in the selected core 10. If a selecting current is employed which reaches a value of approximately .25 I*d*, substantially all of the flux change is produced in the selected core 10 and substantially no flux change is produced in the non-selected core 12. Both curves 60 and 64 approach an asymptote for values of selecting current I*d* greater than .25 I*d*. Accordingly, for any selecting current I*d* above the value .25 I*d*, substantially all the volt-time integral output of the driver source 22 is absorbed by the selected core 10. Thus, the permissible tolerance of the selecting signal I*d* is relatively large, because a flux change of about 90 percent of the total flux is sufficient for a practical system.

The two middle curves 62 and 66 of FIG. 5 show flux changes produced in the cores 10 and 12, respectively, by a drive current $Ia(2)$ of such an amplitude as to produce a magnetizing force in excess of the coercive force H*c* of the cores 10 and 12. The latter two curves approach an asymptote at a value of selecting current I*d* equal to approximately 0.33 I*d*. Thus, the permissible tolerance for the selecting signal amplitude is somewhat less than the permissible tolerance when smaller amplitude drive currents are used. Observe, however, that the larger drive currents provide faster switching than is obtained when smaller amplitude drive currents are used.

In one specific illustrative embodiment of FIG. 1, ferrite memory cores were used. Using one known coincident-current technique, 1.0 microsecond was required to change the state of a selected one of a pair of cores. In a system according to the present invention, it was possible to change the state of a selected one of the cores 10 or 12 in 0.4 microsecond by using a difference signal $(Ia-Id)$ equal to the coercive force H*c* of the cores, and in 0.2 microsecond, by using a difference signal $(Ia-Id)$ greater than the coercive force H*c* of the cores.

A suitable driver source 22 for the drive currents I*a* and I*b*, which source acts substantially as a voltage source, is a magnetic switch core. The cross-sectional area of the switch core is made equal to the cros-sectional area of one of the memory cores. Thus, the total volt-second output of the switch core is equal to the volt-seconds required to change one of the cores 10 and 12 between its two remanent states. Some additional material may be added to the switch core to compensate for resistance losses in the drive windings, if such compensation is required. However, in practicing the present invention, resistive losses are often negligible. The switch core produces a drive current of constant volt-second output when the switch core is itself driven by a constant current source. A suitable constant current source, for example, is a pentode-tube amplifier circuit. The amplitude of the switch core output signal is proportional to the rate at which the flux is changed in the switch core.

Figure 6:
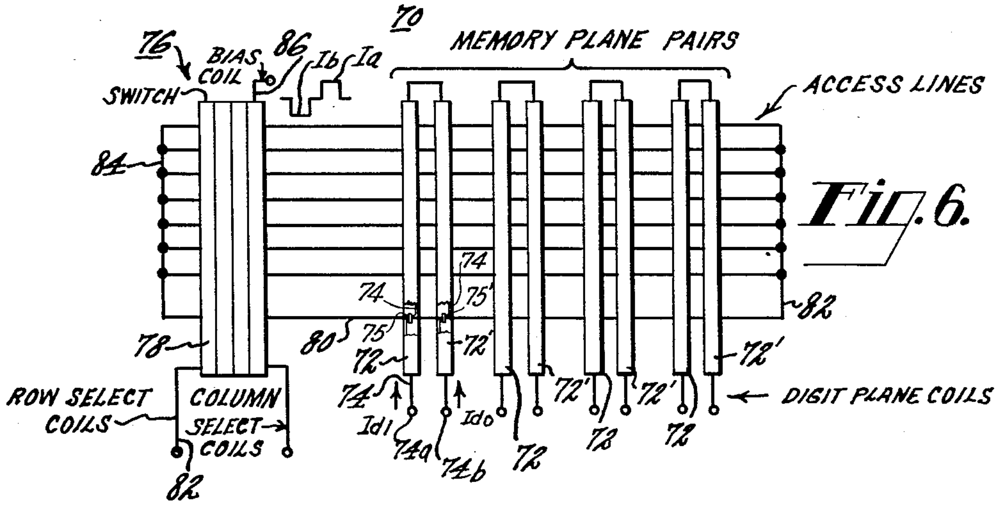
FIG. 6 is a schematic diagram of a three-dimensional memory system, according to the invention, which employs a magnetic switch.

FIG. 6 is a side view of an embodiment of the invention in a three-dimensional memory array 70. The array 70 illustratively has eight 8 x 8 arrays of memory cores arranged in four aligned pairs of memory planes 72 and 72'. Each pair, 72 and 72', of memory planes has a single selecting coil 74. One pair of memory planes 72, 72' is partially broken away to show the linkage of the selecting coil 74 to a pair of aligned cores 75, 75'. A selecting coil 74 is first linked to all the cores 75 of a memory plane 72 and is then linked to all the cores 75' of the other plane 72' of the same pair. Note that the selecting coil, beginning at one terminal **74*a*, links a core 75 of the plane 72 of a pair in one sense, and links the core 75' in a corresponding position in the other plane 72' of a pair 72, 72' in the opposite sense. Thus, any two aligned cores 75, 75' of a pair of the planes 72 and 72' are linked in opposite senses by the selecting coil 74 of that pair. Each selecting coil 74 may link all the cores of each plane in known "checkerboard" fashion. The selecting coil 74 also may serve as a sensing winding during the read portion of the memory cycle. If desired, however, a separate sensing winding (not shown) may be used for each pair of memory planes 72 and 72'. If used, each of the separate sensing windings is linked to all the cores of the pair of planes in the manner described for the selecting coil 74**.

A magnetic switch 76 may be used for providing the drive currents I*b* and I*a*. The switch 76 has, for example, four separate 8 x 8 arrays 78 of switch cores. The four switch arrays 78 are aligned with the memory plane pairs 72 and 72'. A separate access line 80 is threaded through each group of the aligned switch cores and the aligned memory cores 75, 75'. Note that an access line 80 links all the memory cores 75, 75' of an aligned group in the same one sense. A first shorting bus 82 connects all the access lines 80 in parallel with each other at the memory side of the array, and another shorting bus 84 connects all the access lines 80 in parallel with each other at the switch end of the system.

A plan view of one of the switch arrays 78 is shown in FIG. 7. All the cores of each row of switch cores 80 is linked by a different row coil 82, and all the cores of each different column of cores 80 is linked by a different column coil 84. The row and column coils 82 and 84, beginning at the terminals 82*a* and 84*a*, respectively, link any one of the switch cores 80 in the same sense.

The terminals 82*a* of the row coils are connected to separate row drivers (not shown) for selectively applying a row current to a desired row coil 82. The column coils 84 are connected to separate column drivers (not shown) for selectively applying a current to a desired column coil 84. Each of the row and column drivers (not shown) for the switch 76 is preferably a constant-current source. The row coils of one of the switch arrays 78 are connected in series with the row coils of a succeeding array 78 in the switch 76 of FIG. 6. Similarly, the column coils of any one switch array 78 are connected in series with the column coils 84 of a succeeding array 78. A bias coil 86 links all the switch cores of the array 78 in "checkerboard" fashion. The cross-sectional area of magnetic material of any one switch core is made substantially equal to the cross-sectional area of magnetic material of any one memory core. Thus, the maximum volt-second output of the switch cores of any one position of the switch 76 is approximately equal to the volt-second integral required to change four of the memory cores from one state to the other. Although a different number of switch arrays 78 may be employed, preferably the total cross-sectional area of material in an aligned group of switch cores equals the total cross-sectional area of material of four of the memory cores.

During operation, a D.C. (direct current) bias applied to the D.C. bias coil 86 maintains each of the switch cores saturated in one of their states P and N. Currents, concurrently applied to one of the row coils 82 and one of the column coils 84 change a selected group of the switch cores, linked by both these coils, from their initial to their other state. The changed switch cores produce a drive signal I*b* on the selected access line 80 coupled thereto. The drive signal I*b* changes one core of every pair of the aligned memory cores linked by the selected access line 80 to the state N. Each of the remaining access lines 80 provides a separate return path for the drive signal I*b*. The different output signals produced in the four separate, selecting windings 74, when the drive signal I*b* is applied, indicate by their polarities the binary information stored in the separate ones of the changed memory cores.

During the write operation, the row and column currents are removed from the row and column coils 82 and 84 of the switch 76. The D.C. bias then changes the group of switch cores back to their initial remanent states, thereby producing an opposite-polarity drive signal I*a* in the selected access line 80. At the same time, or preferably slightly before, one of the selecting currents $Id_1$ and $Id_0$ is applied to the selecting coils 74 of each pair of memory planes 72 and 72', thereby writing information into the pairs of memory cores linked by the selected access line 80.

Other know types of magnetic switches may be employed in place of the illustrative D.C. biased switch 76. It can be shown that, by using a D.C. biased magnetic switch for memory planes 72 having an 8 x 8 or larger array of memory cores, the drive current I*a*, during the write portion of the operation, can produce a coercive force approximately three times larger than the coercive force H*c* of any of the selected memory cores without producing any appreciable flux change in non-selected ones of the memory cores. Thus, faster operating speed can be achieved because of the larger amplitude drive currents permitted.

Other known arrays than the three-dimensional array illustrated herein may be employed, if desired. For example, two-dimensional arrays, either rectangular, square or hexagonal, may be used; or other known *n*-dimensional arrays may be employed.

The memory planes 72 may be made from individual magnetic toroids or from apertured plates of substantially rectangular hysteresis loop material. Likewise, the switch arrays 78 can be made from individual arrays of switch cores or from apertured magnetic plates.

There has been described herein improved memory systems which provide faster operation and which, at the same time, permit the tolerances of the selecting currents to vary over a relatively wide range.

Suitable drive currents are advantageously obtained by using magnetic switch elements as the driver sources. In such case, the speed at which the magnetic switch elements are driven is substantially independent of the amplitude of selecting current used for writing information into the memory cores, whereas, in certain prior memory systems of similar type, the speed at which the switch elements are driven is closely dependent on the amplitudes of selecting currents.

What is claimed is:

1. In a magnetic system, a plurality of pairs of magnetic cores, each of said cores having a substantially rectangular hysteresis loop and each having two remanent states, a separate winding linked to each different pair of cores, another winding linked to all said cores, said other winding linking the two cores of any pair in opposite senses, and means for changing the remanent state of a desired core of a desired one of said core pairs comprising means for applying a signal to the separate winding of said desired core pair in a direction to change each from an initial to the other of said states, and means for applying another signal concurrently to said other winding in a direction to change said desired core from said initial to said other state and to oppose the change of the other core of said desired core pair from said initial state.

2. In a magnetic system, the combination of a plurality of pairs of magnetic cores of substantially rectangular hysteresis loop material, each of said cores having two remanent states, a first winding linking both cores of said pairs in the same sense, a plurality of second windings each linking both cores of a different one of said pairs, each of said second windings linking the said cores of a pair in opposite senses, means for selecting the remanent state of a desired core in each of said pairs comprising means for applying a signal of one polarity to said first winding, and means for concurrently applying to each second winding another signal of either said one or the opposite polarity.

3. In a magnetic system, the combination of a pair of similar cores of substantially rectangular hysteresis loop material having two states, a magnetic switch core, a first winding linked to said switch core and each core of said pair of cores, a second winding linked to each core of said pair of cores, said first and second windings being linked to one core of said pair in the same sense and to the other core of said pair in the opposite sense, means for selecting a desired core of said pair of cores comprising means for applying a signal to said second winding in a direction to change said desired core from an initial to the other of said states and to hold the other core of said pair in its initial state, and means for producing a flux change concurrently in said switch core in a direction to produce a signal in said first winding in a direction to change both cores of said pair from their initial to their other states, the intensity of the magnetizing forces generated by said first winding signal exceeding the intensity of the magnetizing forces generated by said second winding signal.

4. In a magnetic system, a plurality of pairs of arrays of magnetic cores of substantially rectangular hysteresis loop material, said cores each having two remanent states, a plurality of first windings each linking a different core in each of said arrays, a plurality of second windings each linking all the cores in a different pair of said arrays, and each core of any array having a corresponding paired core in the other array of that pair of arrays, any one of said second windings being linked to any one core of said arrays in one sense and being linked to the core paired with said one core in the opposite sense, and means for selecting one or more desired cores comprising means for applying to the first winding linking said desired cores an excitation in a sense to change all the paired cores linked thereby from an initial to the other of said states, and means for applying concurrently to each said second winding an excitation in a sense to aid said first-mentioned excitation in changing the states of said desired cores and to oppose said first-mentioned excitation from changing the states of the said cores paired with said desired cores.

5. In a magnetic memory system, the combination comprising a first plurality of planes of magnetic cores of substantially rectangular hysteresis loop material, each plane including a plurality of magnetic cores arranged in rows and columns, a second plurality of planes each paired with a different one of said first plurality of planes, the cores in said second plurality of planes being aligned with the cores in said first plurality of planes, a separate selecting coil coupled to all the cores of each pair of planes, said selecting coil being connected to one core of a pair in one sense and to the other core in the same pair in the opposite sense, a plurality of access lines, each of said access lines coupled in the same sense to a different core in each plane, all of which cores are aligned with each other, means to selectively change the remanent state of a desired core in each of said pairs of planes comprising means for applying a first excitation to the access line coupled to said desired cores, and means to apply another excitation to each said selecting coil in a direction to aid said first magnetizing force in changing the state of said desired core of a pair of said planes and in a direction to hold the other core of the same pair of planes in its initial remanent state.

6. In a magnetic memory system, the combination comprising first and second planes of magnetic cores of substantially rectangular hysteresis loop material, each plane including a plurality of magnetic cores arranged in rows and columns, said planes being spaced from each other and having the cores in said first plane aligned with cores in said second plane, a selecting coil coupled to all the cores in said first and second planes, any one of said cores of said first plane being linked in one sense by said selecting coil, and the aligned core in said second plane being linked in the opposite sense by said selecting coil, and a plurality of access lines, each of said access lines being coupled in the same sense to a different core in each plane.

7. In a magnetic memory system, the combination as claimed in claim 6, including a magnetic switch having two or more planes of cores of magnetic material positioned adjacent each other with their cores in register and with their cores aligned with said cores of said first and second planes, a different one of said access lines being linked to a different aligned core in said planes of said switch, and means for selecting a desired access line comprising means for driving the switch cores linked by that access line from one state to the other.

References Cited in the file of this patent

UNITED STATES PATENTS

| | | |
|---|---|---|
| 2,734,185 | Warren | Feb. 7, 1956 |
| 2,736,880 | Forrester | Feb. 28, 1956 |
| 2,768,367 | Rajchman | Oct. 23, 1956 |
| 2,781,504 | Canepa | Feb. 12, 1957 |
| 2,801,344 | Lubkin | July 30, 1957 |
| 2,805,020 | Lanning | Sept. 3, 1957 |
| 2,846,667 | Goodell | Aug. 5, 1958 |

OTHER REFERENCES

"Testing Magnetic Decision Elements" (Goodell), Electronics Magazine, January 1954, pp. 200–203 (page 200, FIG. 2 relied on).